UNITED STATES PATENT OFFICE.

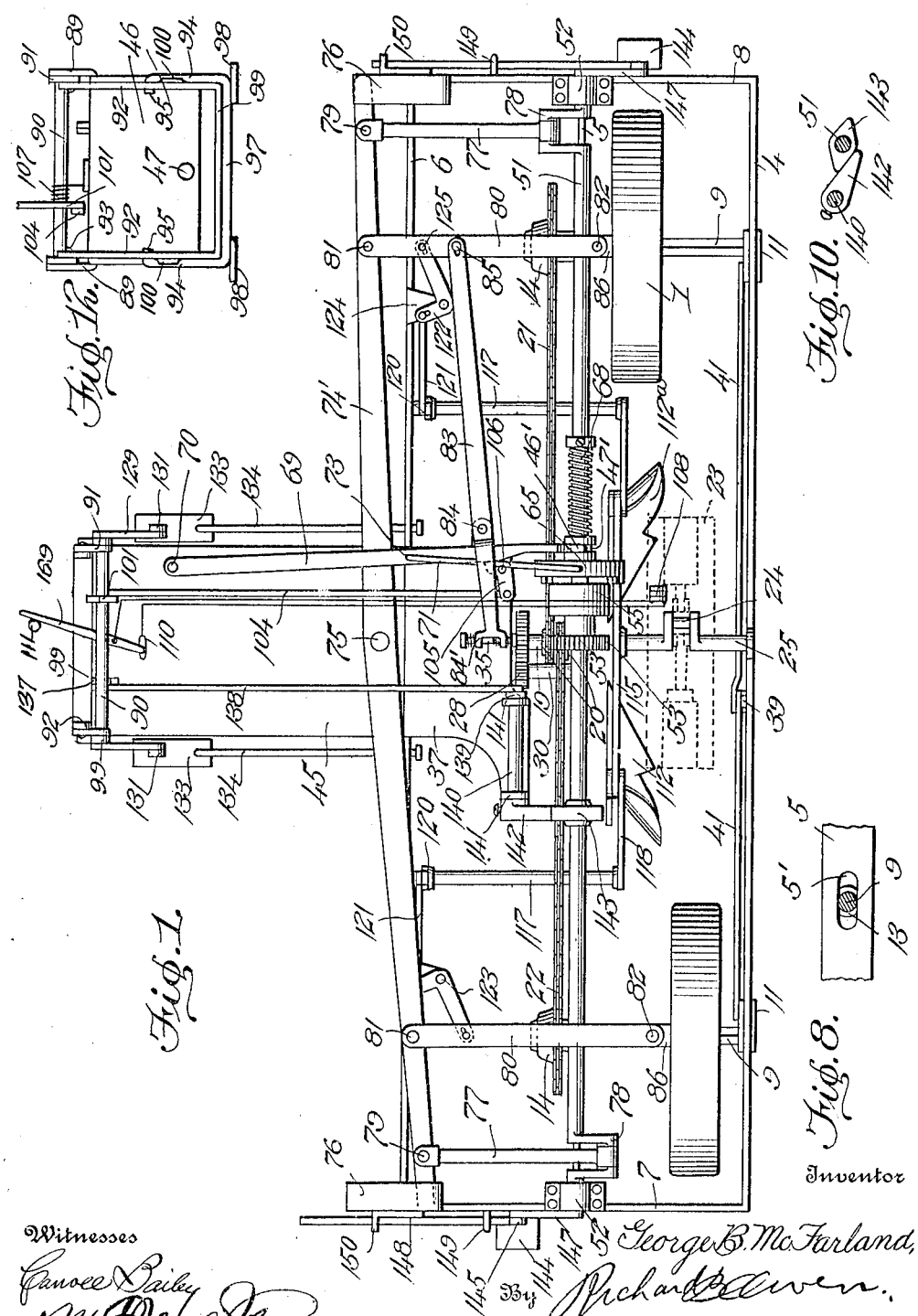

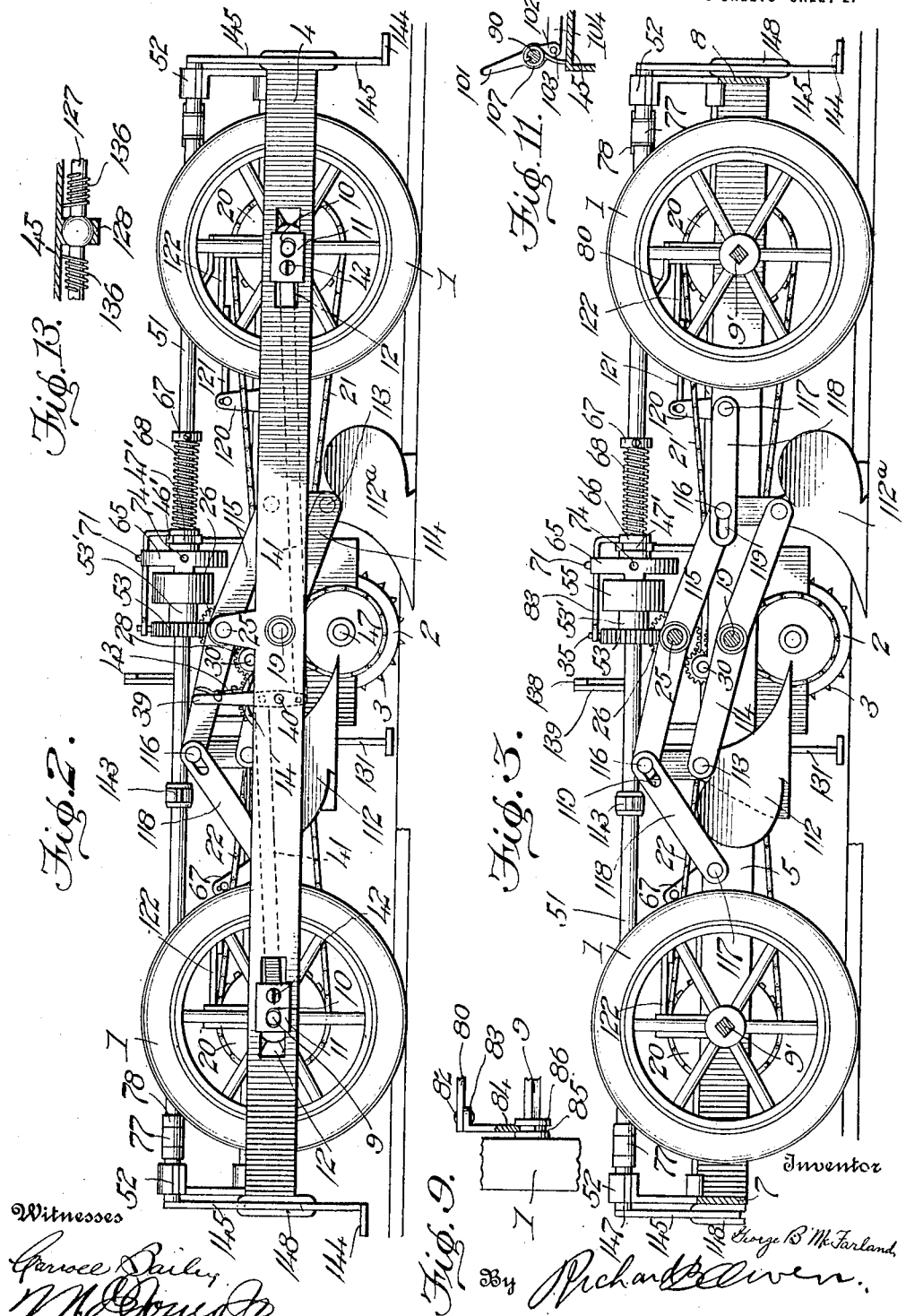

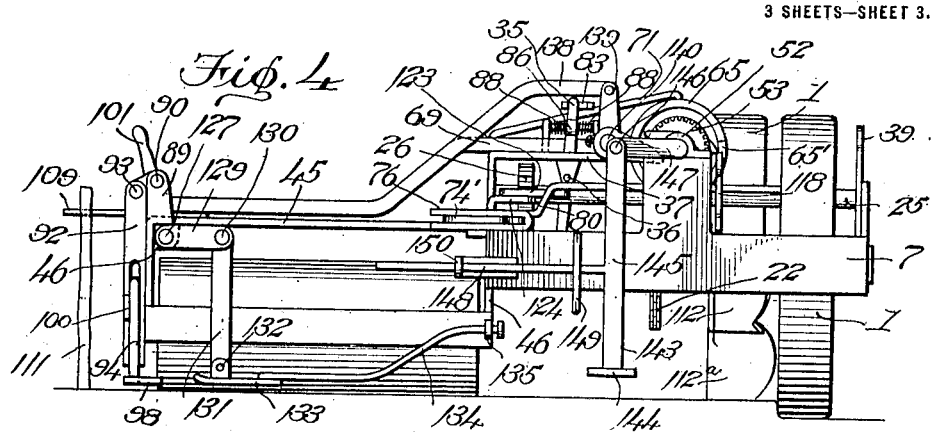
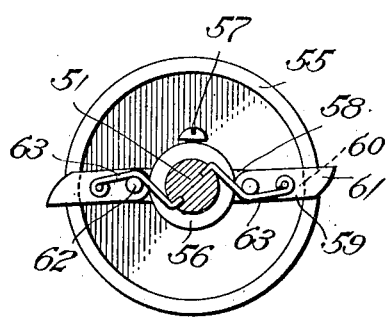
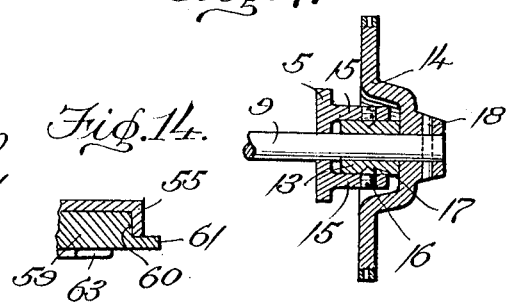
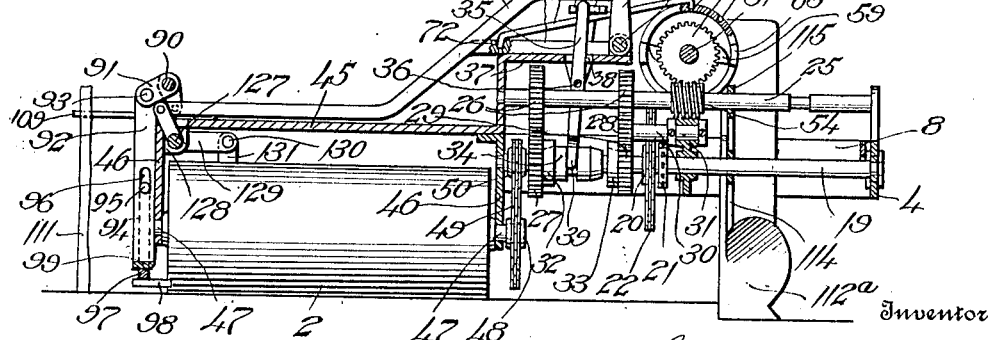

GEORGE B. McFARLAND, OF COLUMBUS, NEBRASKA.

AUTOMATIC SELF-PROPELLED PLOWING-MACHINE.

1,291,969.      Specification of Letters Patent.      Patented Jan. 21, 1919.

Application filed October 10, 1914. Serial No. 866,102.

*To all whom it may concern:*

Be it known that I, GEORGE B. MCFARLAND, a citizen of the United States, residing at Columbus, in the county of Platte and State of Nebraska, have invented certain new and useful Improvements in Automatic Self-Propelled Plowing-Machines, of which the following is a specification.

My invention relates to plowing machines and its main object is to provide a machine of this character which may operate to plow the soil of a given area without the aid of an operator or attendant after being set in motion, and which may engage suitable means to cut off the motion of the propelling engine when the desired area has been plowed.

A second object is to provide means operating automatically to cause a plowing machine to reverse the direction of movement after opening a furrow of a predetermined length so as to successively open furrows parallel to each other until the desired area has been plowed.

A third object is to provide means whereby the soil treating plows or elements of a plowing machine may automatically move laterally with respect to the traction wheels, at the end of a furrow and may also move so as to be in position for operation in the opposite direction.

A fourth object is to provide means operable to cause return travel of a plowing machine upon engagement of means thereon with a furrow extending at an angle to the direction of plowing.

A fifth object is to provide means on a plowing machine operable upon its reaching the end of a furrow to elevate the machine and move it laterally of the furrow into position for operation to open a furrow parallel to the opened furrow or furrows.

A sixth object of the invention is to provide a plowing machine having a pair of traction wheels to travel in the direction of the furrows but normally out of alinement so that one wheel may travel directly behind a mold board and the other wheel may travel the last completely opened furrow to guard against the machine deviating from a line or path parallel to the lines of plowed furrows.

A seventh object is to provide a plowing machine adapted to be automatically shifted for operation in the opposite direction upon reaching the end of a furrow and have one traction wheel remain in the last opened furrow and the machine shift relatively to said wheel to move a plow to position for opening the next furrow and move a second wheel across said last opened furrow to position immediately behind the plow to travel in the furrow being opened.

An eighth object is to provide plow means for a plowing machine of the nature set forth, which will automatically shift for proper operation according to the direction of travel upon the machine reaching the end of an opened furrow.

A ninth object is to provide means whereby the elevating means which engages the soil on the sides of a furrow running at an angle to the direction of plowing, may have a tilting movement to permit better engagement with uneven soil.

A tenth object is to provide a self propelled plowing machine having laterally slidable and laterally turnable traction wheels, a frame movable laterally relatively to the wheels, shiftable plows on said frame, jack means to elevate the plows, operating means for the plows and jack means, and means operable to trip clutch mechanism of said operating means.

An eleventh object is to provide means whereby the traction wheels which travel in the furrows may be brought into alinement and the plows elevated, and certain downwardly projecting parts of the machine detached and the machine operated only as an ordinary vehicle as when traveling to or from the field.

With a view to attaining the foregoing objects as well as additional objects, as will become apparent from the description hereinafter following taken in connection with accompanying drawings illustrating the preferred embodiment, the invention resides in certain novel features of construction, combination and arrangement of the parts.

In said drawings:—

Figure 1 is a plan view of the improved plowing machine;

Fig. 2 is a side elevation of the improved plowing machine;

Fig. 3 is a longitudinal sectional view of the improved plowing machine;

Fig. 4 is an end elevation of the improved plowing machine;

Fig. 5 is a transverse sectional view through the improved plowing machine;

Fig. 6 is an enlarged detail illustrating a portion of the clutch mechanism employed on the driven shaft of the machine;

Fig. 7 is an enlarged detail in section, showing the pivotal mounting of one of the furrow wheels;

Fig. 8 is an enlarged detail illustrating the enlarged slot in one of the frame beams through which the furrow wheel axles pass;

Fig. 9 is a detail showing the connection of the wheel shifting means with the axle of a wheel; and Fig. 10 is an enlarged detail showing the arrangement of the cams which cause the operation of the elevating means adjacent the roller;

Fig. 11 is a detail view of part of the shifting means for the jack means adjacent the traction roller;

Fig. 12 is an elevation of the trip frame;

Fig. 13 is a detail illustrating the mounting of one of the shafts for the elevating jack mechanism, and Fig. 14 is a detail section illustrating the engagement of one of the clutch dogs with the drum.

Referring specifically to the drawings wherein like reference characters designate like or similar parts, the machine is mounted for travel on wheels 1 which move in furrows and on an elongated roller 2 at one side of and intermediate the wheels 1, preferably having ribs 3 on its periphery extending longitudinally and being for the purpose of beating, pulverizing and rolling the previously turned furrow ridge. The frame of the machine consists of longitudinal beams 4, 5 and 6 and end beams 7 and 8. Axles 9 support the wheels 1 from the frame and these axles have square portions 9' on which the wheels are slidably mounted and at the same time mounted so as to turn with the axle. Said axles at one end extend into enlarged apertures 10 of slides 11 which move longitudinally in enlarged openings or slots 12 provided in beam 4. Adjacent their inner ends, axles 9 extend through elongated openings or slots 5' and then into a hub 13 of a sprocket wheel 14. Beam 5 has laterally extending separated lugs 15 which carry pins 16 to engage the hub 13 and mount it for horizontal pivotal movement. Sprocket wheels 14 are fastened for turning movement in shaft 19 by means of pins 18. The sprocket wheels 14 are driven from a shaft 19 and to this end shaft 19 has sprocket wheels 20 keyed thereon. Over one of the sprocket wheels 20 is trained a sprocket chain 21 which is also trained over one sprocket wheel 14. A second sprocket chain 22 is trained over the other sprocket wheel 20 and other sprocket wheel 14.

The plowing machine is self-propelled and to this end an engine, preferably of the internal combustion type, as shown at 23 is suitably mounted on the frame. This engine or power medium through proper connection with a crank 24 drives a shaft 25. Gear wheels 26 are keyed on the shaft 25 and one of these gear wheels 26 meshes with a gear wheel 27 loosely mounted on the shaft 19. The other gear wheel 26 meshes with an intermediate gear wheel 28 which in turn meshes with a gear wheel 29 loosely mounted on the shaft 19. Gear wheel 28 is keyed to a shaft 30, which shaft is suitably mounted in a bearing 31 advantageously connected to the frame. Each gear wheel 27 and 29 has a laterally extending clutch collar. The clutch collar of gear wheel 27 is designated 32 and the clutch collar of gear wheel 29 is designated 33. Intermediate these clutch collars slidable on and turnable with the shaft 19 is a double end clutch member designated 34. This clutch member is engageable with the clutch collars 32 and 33 in order to drive the sprocket chains and accordingly the axles and wheels in opposite directions. As the means for directly shifting or sliding clutch member 34, a lever 35 may be provided, being pivoted at 36 to lugs depending from a platform elevation 37 on the frame. This lever extends through an enlarged slot 38 of the frame 37 and at its lower end has a yoke 39 which extends into a continuous groove of the clutch member 34.

Suitable means is provided to steer the wheels and to this end I utilize an operating lever 39 which is pivoted to beam 4 at 40 and to which are pivoted on opposite sides of the fulcrum, pitmen or bars 41 pivotally connected to the slides 11 by means of bolts 42. As means to fasten the lever 39 against movement at times may be desired, I diagrammatically show a plunger for the lever at 43, which plunger is engageable with a toothed segment 44 mounted on the beam 4.

Above the roller 2 is a platform 45 which is suitably connected to the frame. Depending from this platform are hangers 46 which are engaged by trunnions 47 of the roller so as to turnably mount the roller. In order that the roller 2 may be positively driven, one of its trunnions 47 extends beyond the adjacent hanger 16 and there has keyed to it a sprocket wheel 48 over which is trained a sprocket chain 49 also trained over a sprocket wheel 50 keyed to shaft 25, which may have bearing at its inner end in one of the hangers 46.

As the means for shifting the frame and wheels laterally, I employ the following parts. A driven shaft 51 extends longitudinally of the frame and is journaled in bearings 52 mounted thereon. On this shaft 51 is loosely mounted a worm wheel or gear 53 which meshes with a worm 54 mounted on the shaft 25. This gear wheel 53 is mounted on a collar 53' of a clutch device in the nature of a hollow drum 55 open at one face thereof. Suitable clutch mechanism as best seen in Fig. 6, is adapted to engage the inner periphery of the annular wall of the drum. To this end a bracket 56 is rigidly fastened by a set screw 57 to the shaft 51, which bracket has radially extending lugs 58 on which are pivotally mounted clutch dogs 59 having faces 60 to frictionally engage the inner periphery of the annular wall of drum 55 and having projections 61 to extend beyond said wall. These dogs are pivoted to the lugs 58 at 62 and springs 63 connected to the shaft 51 and to the dogs are provided to normally maintain and urge the dogs into frictional engagement with the drum. At certain times during operation of the plowing machine, shaft 51 should not turn and therefore suitable means is provided to maintain the dogs 59 out of engagement with the drum during the proper phases of operation. This means may consist of a clutch device or disk 65 mounted on the shaft slidably but so as not to turn therewith. This disk 65 has a collar 66 between which and a collar 67 fastened to the shaft 51, is interposed a coil spring 68 which normally urges the plate 65 toward the drum 55. A lever 69 movable in a horizontal plane is pivoted at 70 to the platform 45 and at its inner end has a yoke 46' which extends into a continuous groove 47" provided in collar 66. A connector rod 71 has lugs 72, one at each end thereof. One of these lugs is adapted to removably extend into a recess 73 of the lever and into either recess 74 of the plate 65. This rod 71 serves to mount the plate 65 against rotation with the shaft 51.

A lever 74' of substantially the length of one of the longitudinal beams 4, 5, 6, is pivoted at 75 to the platform 45 and slides in suitable U-shaped guides 76 at its ends, mounted on the frame. This lever is rocked in a horizontal plane by means of pitmen 77 pivotally mounted on cranks 78 of the shaft 51 and pivotally connected to the lever 74 at 79. It will be noted that the cranks 78 are provided on opposite sides of the axis of shaft 51.

Arms or bars 80 are pivoted at 81 to the lever 74' and are pivoted at 82 to one arm 83 of an angle bracket, the other arm of which is bifurcated at 84 and extends into a continuous groove 85 provided in hubs 86 of the wheels 1, this latter structure being better shown in Fig. 9.

Lever 35 is adapted to be shifted through the movement of one of the arms 80 and to this end a lever 83 is suitably pivoted to the frame at 84 and to the lever 80 at 85. This lever 83 has at its free end a yoke 84' and between the tines thereof the lever 35 is received. The tines provide in effect an elongated slot in which the lever is contained. It might be here mentioned that lever 35 has an enlargement 86 through which passes a pin. On the pin are secured springs 88 which bear against the lugs and against opposite sides of the levers to normally maintain it in position where the clutch member 34 is neutral to the clutch collars 32 and 33. Suitable means is provided whereby the plate 65 may be moved longitudinally of the shaft 51 so as to release the dogs 59. The following mechanism may be operated to accomplish this end. On the platform 45 are mounted suitable bearing brackets 89 in which a shaft 90 is journaled and on which shaft are rigidly carried cranks 91. From the cranks 91 suitable trip mechanism is supported. Of this mechanism a U-shaped frame has its side arms 92 pivotally connected to the cranks 91 at 93. A second U-shaped frame is provided which has side arms 94, terminating at its upper end in an inwardly extending lug 95, and which lugs extend through elongated slots 96 of the arms 92. Arms 94 are bridged or connected by a horizontal arm 97 to which may be fastened shoes 98 to directly engage the ground. Arms 92 are bridged or connected by a horizontal arm 99 which is normally adapted to rest directly on the horizontal arm 97. A lug 100 is provided on one of the arms 92 to limit the inward movement of the arms 94. To the shaft 90 is fastened an operating lever 101 and also is rigidly fastened a crank lug 102 to which is pivoted at 103, a link 104 which is pivoted to a bell crank lever 105 having its pivot at 106. This bell crank lever is in effect a cam as it is in engagement with the lever 69 and is operable thereagainst to shift the lever in order to slide the plate 65. A spring 107 may be operatively associated with the lever 101 to urge it to position maintaining the disk 65 in engagement with the clutch dogs 59.

The necessary electric sparks for the ignition of the carbureted mixture within the cylinders of the engine 23 is provided by the electric circuit means 108. The circuit is closed by a lever 109 to which one of the wires is fastened in conducting relation and which lever engages a contact 110 to which the other circuit wire leads. It will be realized that when the lever contacts with the conductor 110, that the spark circuit will be closed and that when the lever disengages the contact 110 and is in the position shown in Fig. 1, that the spark circuit is broken and the engine is at rest. In order to open the spark circuit to stop operation of the engine when its proper area has been plowed, I may drive a stake or other abutment 111 into the ground and which the lever 109 will engage and be shifted through such engagement.

The plows or mold boards are shown at 112 and 112ª and pivoted thereto at 113 is a lever 114 pivotally mounted on the shaft 19. Also a lever 115 is pivotally mounted on the shaft 25 and pivotally connected at 116 to the mold boards 112 and 112ᵃ. On shafts 117 journaled in and transversely of the beams 5 are provided cranks 118 which have elongated slots 119 through which the pivots 116 pass. Vertically extending cranks 120 are provided on the shafts 117 and to these cranks are pivoted links 121 which are also pivoted to bell cranked levers 122 in turn pivoted at 123 to lugs 124 of beam 6 and pivoted at 125 to the bars 80.

Suitable elevating and shifting means for the machine is preferably employed as follows. A transverse shaft 127 is mounted below the platform 45 in a bearing 128 which is of such construction as to permit the shaft 127 to tilt vertically on either side of the bearing. This shaft at each end thereof has rigidly fastened thereon a crank 129 to which is pivoted at 130 a depending link or standard 131 to which is pivoted at 132 a lug of a ground engaging shoe 133. The shoes 133 are normally held in a substantially horizontal position by means of rods 134 which are slidably mounted in lugs 135. A spring 136, referring now more particularly to Fig. 13, is fastened to the shaft 127 and to a suitable part of the machine and tends to normally hold the shoes 131 elevated above the ground. The crank 137 is fastened to the shaft 127 and to the crank is pivoted a link 138. Link 138, is pivoted to a crank 139 of a shaft 140 mounted in brackets 141 of the platform 37. A cam or arm 142 better shown in Fig. 10 is fastened on the shaft 30 and adapted to be engaged at proper times by a two armed cam 143 mounted on the shaft 51. Suitable elevating jacks are provided at each end of the machine and generally designated 143. These jacks have shoes 144 and have standards 145, the latter being pivotally mounted on pins 146 of cranks 147 provided on the shaft 51 and extending in opposite directions. These jacks 143 have laterally extending guide arms 148 which pass through openings in brackets 149 and 150.

In operation, with the parts in the position shown in the drawings after starting of the engine, the machine will travel toward the left. In this position, it will be realized that the mold board 112ᵃ is operating to turn the furrow slice while the mold board 112 is elevated. At first a furrow is opened at opposite ends of the area to be plowed and then the plowing is along lines intermediate and at right angles to the first opened furrows. Say that the machine while traveling toward the left reaches one of the first opened furrows, the roller 2 will enter the furrow, the machine accordingly tilting. When the roller 2 enters the furrows, the shoes 98 engage the ground on opposite sides of the furrow as they cannot travel downwardly with the roller. This downward travel of the roller causes the two U-shaped frames 94—97 and 92—99 to move the cranks 91 upwardly thereby partially rotating the shaft 90 through the motion of which link or rod 104 shifts the bell-crank lever 105 so that it bears against the lever 69, causing the same to move against the tension of the spring 68, away from the drum 55. It is understood that normally the springs 63 force the dogs 59 into pivotal engagement with the drum whereby the shaft 51 is turned from the power shaft 25 through the medium of the gears 53 and 54. Upon the turning of shaft 51, the cam 143 acts against the cam 142 to turn shaft 140, slide link 138 turns crank 137 and shaft 127 and through the medium of crank 129 and standard 131, lowering the shoes 133 into contact with the ground and elevating the machine to bring the roller 2 out of contact with the ground. Simultaneously with the engagement of the shoes 133 with the ground, the jacks 143 are moved downwardly into engagement with the ground through the operation of the cranks 147. It is to be noted that only one of the jacks 143 engages the ground at a time. Simultaneously with the lowering of the jacks 143 and shoes 133, lever 74′ is shifted by the pitman 77 through the movement of which lever 74′, arms 80 are shifted as well as the brackets 83, and one of the wheels 1. The shifting of the roller wheel and frame does not occur until the machine has been elevated at one end. Say the machine is elevated at the end adjacent the left hand wheel of Fig. 1. By further rotation of the shaft 51, the machine at that end would be moved laterally twice the length of the crank 147, it being understood that the wheel at the end mentioned moves with the frame and that the other wheel remains stationary in the furrow and that the axle 9 of the latter wheel slides in the wheel hub while the frame moves laterally. It will be noted that while the machine plows, the wheels 1 are out of longitudinal alinement. This is owing to the fact that one of the wheels travels in the furrow last completed by the plow and that the other wheel travels in the furrow in the process of being opened by the plow and travels directly behind the plow. In order that the wheels will be in this relation when shifted, the left hand wheel of Fig. 1 during the operation described, would be moved across the furrow in which the other wheel remains stationary and into position directly behind the plow 112 so as to travel in the furrow opened by said plow 112. During the movement of the parts described, through the movement of bar 80, bell crank 122, link 121, shaft 117 and link 118, the plows are shifted to lower the plow 112 behind which one of the wheels 1 travels and to elevate the other plow. The operation described it will be realized effects the lowering of one jack 143 and the shoes 133 and the lateral shifting of the frame so as to be in position for plowing of another furrow, one of the wheels 1 traveling with the frame and the other wheel 1 remaining stationary in the last plowed furrow and the shaft 9 of that wheel sliding in the wheel hub. After the shifting of the plow, it is necessary of course to bring the proper parts into position to move the machine for another plowing operation. Therefore during the movement of the bar 80, the lever 83 is tilted so that one of its tines at the bifurcation 84 will engage with the lever 35, tilt the same and move the proper end of the clutch 34 into engagement with the proper clutch collar 32 or 33 whereupon the motion of shaft 19 is imparted to the roller 2, the sprocket chain and sprocket wheel drive and the shafts 9. It is to be realized that in the shifting of the frame, that the shafts 9 turn slightly in a horizontal plane. This motion is provided for by the pivots 82, slot 5', slides 11 and slots 12. As the frame moves laterally, the U-shaped frame 94—98 swings on the pivots 95 and the rod 97 moving from beneath the frame 92—99 whereupon said frame 92—99 moves downwardly and the shaft 90 assumes its usual position, plate 65 thereupon returning to its usual position in order that lugs 65' thereon may engage the clutch dogs 59 to release them from the drum 50 so that the drum will not turn with the shaft 51. Should the other first made furrow receive the roller 2, the opposite wheels would remain stationary and move with the frame, respectively, the elevating mechanism working as before, and the trip mechanism also working as before, and the plows respectively moving from lowermost to elevated position, it being understood that the lever 35 would be so shifted as to move the clutch 34 into engagement with the other clutch ring so as to cause travel of the machine in the opposite direction. Due to the provision of the intermediate gear 28, the gear wheel 29 is of course driven in an opposite direction to the gear wheel 27. It takes a one-half revolution to cause the shifting of the machine, on the part of the shaft 51 and therefore only two lugs 65' are provided on the disks so as to move the clutch dogs out of engagement with the drum 50 upon each half turn of the shaft 51. It is to be realized that as one lifting jack 143 is lowered, the other jack is elevated. As the shaft 51 only makes a half turn as previously stated, the rod 71 engages the disk 56 at a point equidistant from the lugs 65'. Should it be desired to operate the machine as an ordinary self-propelled vehicle, to move it to or from the field, the rod 71 is moved out of the recess 74 shown in Fig. 5 and then moved into the other recess 74 shown in Fig. 5, so as to permit but a one-fourth turn of the shaft 51 before the dogs 59 engage the lugs 65'. Steering is effected by operation of lever 39. Upon the machine operating for this quarter turn, the plows are moved to a position where they are at the same height. One of the jacks 143 however will be lowered into abutment with the ground as will the U-shaped frames 92—99 and 94—97. Before the shaft operates for the quarter turn, the jack that would be lowered is removed and also the two U-shaped frames are removed. The standard 145 has sufficient lateral movement with respect to the pin 146 and is also slightly resilient so as to permit its engagement from the lug 146 after which the rod 148 can be readily moved from engagement with the brackets 149 and 150. The arms 92 may be sprung relatively as they are resilient, in order to permit them to disengage the pivots 93. In order that the machine may travel after the quarter turn mentioned, lever 35 is manually operated and held so that the clutch 34 engages the proper clutch collar 32 or 33. In the last furrow path the machine is to travel, a stake 11 may be driven so that the switch arm 109 which is inclined as shown in Fig. 1 may engage it to cause the shifting of said arm off of the contact 110 to thereby break the spark circuit to the engine which will of course cut off the operation of the engine. Owing to the fact that the shaft 127 may tilt in a vertical plane, the shoes 133 may accommodate themselves to uneven ground conditions.

It is to be understood that inasmuch as I have shown only one embodiment of my invention, that changes in the details of construction, arrangement and combination of the parts may be resorted to without departing from the spirit and scope of the invention.

Having thus described my invention what I claim is:—

1. In a soil treating machine, a frame, axles mounted on said frame to extend laterally and in a substantially parallel relation, traction members mounted on said axles and slidable along the length thereof, a lever carried by the frame, and shifting means operable through movement of said lever to shift the traction members along the shaft and to consequently cause lateral shifting of the frame.

2. In a soil treating machine, a frame of elongated form, axles revolubly mounted at the ends of the frame disposed in parallel arrangement and transversely across the frame structure, traction members mounted on said axles to be capable of sliding movement along the length thereof and to turn with the axles, means to impart revoluble movement to the axles and to consequently cause propelling movement of the traction members, a lever mounted on the frame, connected to have movement imparted thereto from the means driving the axles, and means operated by the lever to shift the traction members upon the shaft and to consequently move the frame structure laterally.

3. In a soil treating machine, a frame, traction means by which the frame is carried arranged to have the frame move laterally with respect thereto, power means carried by the frame to drive the traction means, means arranged in conjunction with the power means and traction means to reverse the direction of propulsion of the machine, means to shift the frame laterally upon the traction means, and means arranged in conjunction with the reversing and shifting means to be rendered operative by an obstruction placed in the path of travel of the machine and to cause operation of said parts.

4. In a soil treating machine, traction means, soil treating means carried by the traction means and movable laterally with respect thereto, shifting means by which the soil treating means is given lateral movement, means to be tripped by an obstruction placed in the path of travel of the machine connected with the shifting means to cause operation thereof, and means actuated by said tripping means to cause reversal of the direction of travel of the machine as the frame is moved by the traction means.

5. In a soil treating machine, propelling means therefor, means operable to cause said means to carry the machine in opposite directions, and means carried by the machine to be tripped by an obstruction placed in the path of movement thereof to cause the machine to be bodily shifted laterally and to cause actuation of the propelling means to move the machine in an opposed path of movement.

6. In a soil treating machine, a frame, traction means on which said frame is mounted to be carried in opposite directions and to be capable of lateral shiftable movement, control means mounted in conjunction with the traction means to govern the direction of travel and cause reversal thereof, vertically movable means carried by the frame adapted to be brought into engagement with the earth for raising said frame, means coöperating with said vertically movable means for shifting said frame laterally, and means carried by the frame to shift the control means simultaneously with the movement of the vertically movable means.

7. In a self-propelled soil treating machine, reversing means arranged in conjunction with the propelling means to be shifted to stop movement of the machine and then cause reversal of the direction of travel, and trip means connected with said reversing means and extending from the machine to be operated by engagement with a furrow run at an angle to the direction of travel of the machine.

8. In a soil treating machine, propelling means, means arranged in conjunction with said propelling means to stop travel of the machine at a predetermined point, soil treating means carried by the machine to be held in an operative position and to work in the earth during travel of the machine, means mounted in conjunction with the stopping means to shift the machine laterally upon operation of the stopping means, and means also receiving actuating movement from the stopping means to connect the power means to propel the machine in an opposite direction.

9. A soil treating machine including a frame, traction means by which the frame is carried and moved forward and back across a field, a pair of soil treating means carried by the frame and faced in opposite directions, means arranged in conjunction with the traction means to reverse the direction of travel of the machine, and shifting means connected with said soil treating means and arranged to receive operative movement from the reversing means to move one of the soil treating means into an operative position and remove the remaining means from such position.

10. In a soil treating machine, propelling means by which the machine is carried and moved in opposite directions, means arranged in conjunction with the propelling means to shift the machine laterally, clutch means embodied with the propelling means to control the direction of propulsion and also the means by which the machine is shifted laterally which clutch means comprises a plurality of such devices movable relatively, and means carried by the machine and associated with said clutch means disposed to be engageable with the ground intermittently and to throw the clutches into gear to cause reversal of the direction of travel of the machine and lateral shifting thereof.

11. In a soil treating machine, propelling means by which the machine is carried and moved to travel in opposite directions, means by which the machine is shifted bodily laterally, clutch mechanism associated with said propelling means and lateral shifting means, a pivoted shifting member associated with the clutch mechanism, a cam in the form of a bell crank lever mounted on the machine and operable against said shifting member, a shaft mounted as a part of the machine and provided with a crank, means connecting said crank and said lever, a second crank on said shaft, and a vertically movable device connected with said second crank and mounted to be capable of movement to engage with the ground to cause turning of the crank shaft upon such engagement to consequently bring the parts in connection therewith into operative relation.

12. A soil treating machine including traction means by which the structure is supported and mounted, power means cooperating with the traction means to cause traveling movement of the machine in opposite directions, clutch mechanism including a plurality of clutch devices associated with the power means and one of said devices being movable relatively to the other device, soil engaging means including a suspending frame and a soil engaging frame on which said suspending frame may rest connected with the movable clutch device, and means connecting said soil engaging means to the main frame of the machine to permit movement of the engaging frame from supporting relation with the suspending frame upon lateral movement of the machine.

13. In a soil treating machine, propelling means therefor, clutch mechanism associated with said propelling means having a plurality of clutch devices, one of said clutch devices being movable relatively to the other clutch device, a pivoted shifting arm for said movable clutch device, means to fasten said movable clutch device at different axial adjustments and to said shifting arm, a cam in the form of a bell crank lever movable against said arm, a shaft, a crank on said shaft, a link connected to said crank and to said lever, a second crank on said shaft, a frame pivotally connected to said second crank, a ground engaging frame on which said frame rests, said ground engaging frame being provided with lugs, and the first mentioned frame being provided with elongated slots into which said lugs extend.

14. In a soil treating machine, a frame, traction wheels on which the frame is mounted, a shaft revolubly mounted on the frame, power means carried by the frame to operate the traction wheels to propel the machine and also transmitting turning movement to the shaft, elevating means connected with said shaft to be rendered active through turning of the shaft, soil treating means carried by the frame and shiftable through movement of the shaft, a lever mounted on the frame arranged to shift said traction means and to consequently cause lateral movement of the frame, a connection from said lever to the shaft, and trip means carried by the frame to be rendered operative by contact with an obstruction placed in the path of travel of the machine and to initiate movement of the shaft.

15. In a soil treating machine, a frame, traction members supporting the same, one adjacent each end thereof, said traction members being movable laterally on the frame and the frame being movable laterally on the traction members, a shaft, means to drive said shaft, cranks on said shaft extending in opposite direction, a lever pivoted to the frame intermediate its ends, means connecting said cranks to said lever, and means connected to said lever to move said traction members.

16. In a soil treating machine constructed to be moved in successive paths of travel, a frame, means mounted on the frame by which the machine is propelled in opposite directions, a plurality of plows movably mounted on said frame, levers by which the plows are moved into and out of positions for use, means carried by the frame and receiving actuating movement from the power means thereon to cause bodily shifting of the machine laterally, and trip means carried by the frame to be actuated by an obstruction placed in the path of the machine to cause operation of the lateral shifting means and to impart movement to said levers to move one of the plows to an operative position and the other to an inoperative position.

17. In a soil treating machine axles mounted for turning movement in a horizontal plane, a shaft, means to positively drive said axles from said shaft, means in combination with clutch mechanism to drive the shaft in opposite directions, slides in which said axles are mounted, means mounting said slides for longitudinal movement, and means to shift said slides.

18. In a soil treating machine, a frame, wheels supporting said frame, soil treating means carried by said frame, means carried by said frame for raising the frame from the ground and bodily moving the frame laterally, and means carried by said frame for periodically operating said last mentioned means.

19. In a soil treating machine, a frame, soil treating means carried by said frame, transversely movable supporting wheels carried by said frame, means for bodily lifting and moving the ends of said frame laterally at alternate periods, and means connecting said wheels to said last mentioned means for shifting the same laterally simultaneously with the operation of said lifting and shifting means.

20. In a soil treating machine, a frame, soil treating means carried thereby, transversely movable supporting wheels carried by said frame, means for bodily lifting and moving the ends of said frame laterally at alternate periods, means connecting said wheels to said last mentioned means for shifting the same laterally simultaneously with the operation of said lifting and shifting means, driving means mounted upon said frame, and means for reversing said driving means as said frame is shifted.

21. In a soil treating machine, a frame, a shaft mounted on said frame, means to actuate said shaft to accomplish turning movement thereof, a crank on said shaft, a second shaft, means to drive said second shaft through movement of said first mentioned shaft, a crank on said second shaft, a standard pivoted to said second mentioned shaft, a shoe pivotally connected with said standard, guiding means for said shoe, said parts being so arranged that as the shaft is turned the shoe is brought to bear upon the ground and the machine is elevated, and means carried by the frame and connected to said crank and adapted to be brought into operation while the machine is in the elevated position to cause bodily lateral shifting of the same.

22. In a soil treating machine, a frame, first and second traction members supporting the frame and located at one side thereof, a third traction member located intermediate said traction members and at the opposite side of said frame, operating means carried by the frame to actuate said first and second traction members, supporting axles carried by said frame, means carried by the frame to shift the traction members laterally in a transverse direction upon said supporting axles and to thus accomplish lateral shifting of the machine, and driving means for said tractor.

In testimony whereof I affix my signature in presence of two witnesses.

GEORGE B. McFARLAND.

Witnesses:
J. K. MOORE,
M. E. JONES, Jr.

Copies of this patent may be obtained for five cents each, by addressing the "Commissioner of Patents, Washington, D. C."